Figure 1:
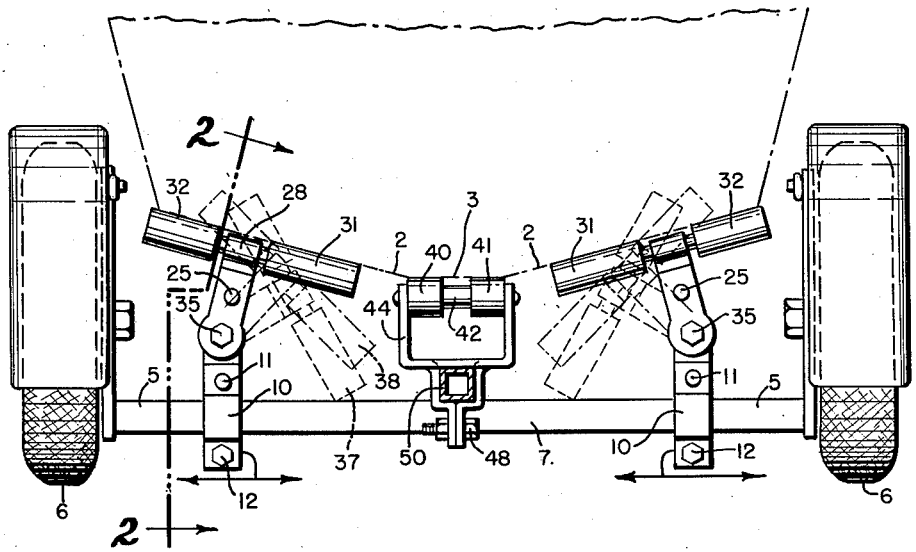

Dec. 17, 1957　　　R. R. FACCHINI　　　2,816,672

TRIPLE ADJUSTABLE BOAT-SUPPORTING BRACKET

Filed Aug. 15, 1956

Rigo R. Facchini
Inventor
by James R. Hodder
Attorney

2,816,672
TRIPLE ADJUSTABLE BOAT-SUPPORTING BRACKET

Rigo R. Facchini, Kingston, Mass.

Application August 15, 1956, Serial No. 604,126

1 Claim. (Cl. 214—84)

My present invention is a novel and improved construction of a boat-supporting bracket for use on wheeled vehicle trailers.

Various types of such boat trailers are now in use wherein a boat is hauled over rollers upon a trailer frame and secured in position for transportation over the highways. Such a trailer is illustrated in my novel and improved construction of my prior and copending application Ser. No. 524,859, filed July 28, 1955, and the present improvement is directed primarily to improve and perfect a trailer of this type.

It is well known that boats of all designs, types, and sizes, and particularly those intended for transportation on vehicle trailers are built with different types and forms of bottom construction, such as a horizontal flat bottom, a curved form in cross-section, and numerous types of so-called V-bottom constructions.

Such adjustable trailer features have heretofore been unsatisfactory, requiring difficult operative adjustments, numerous shifting of fittings or the like; and it is an important object of my present invention to eliminate these prior difficulties to provide a quick, strong, adjustable angular bearing for the boat bottom on any vehicle, to be safely transported.

In carrying out my invention I provide a plurality of easily and readily adjustable features enabling an operator to effect a perfect fit and bearing on the boat bottom by easily made and partly automatic triple adjustments.

Such trailers may have a plurality of bottom supporting members throughout the length of the trailer and, therefore, the strong and quick adjustable constructions which may be readily and speedily made are of special importance. Furthermore, it should be appreciated that these supports for a boat bottom must pick up the weight of the boat at any angular position to which the different lengthwise and widthwise contours of the boat bottom requires support to preserve the boat's design.

Such boats are usually made of an extremely light construction, as of synthetic plastic, plywood, fiberglass, aluminum, and the like and may be easily damaged if the supporting brackets are not properly adjusted. This is especially important in transporting over rough roads as in seeking lakes in camping areas.

Further features, improvements, and advantages will be hereinafter more fully pointed out and claimed.

Figure 2:
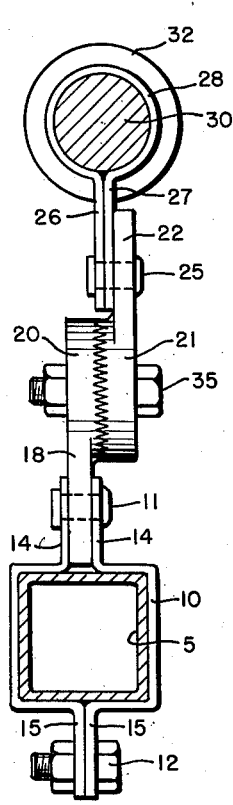

Referring to the drawings illustrating a preferred embodiment of my present triple adjustable bracket invention:

Fig. 1 is a diagrammatic view illustrating my adjustable bracket in position on the rear cross-bar of a trailer of the type in my said prior co-pending application;

Fig. 2 being a side view on the line 2—2 of Fig. 1, on an enlarged scale.

As shown in the drawing, 1 indicates the outline in cross-section of a typical modern V-bottom boat, having the bottom surface at an angle, as shown at 2, each side of the keel or center planking 3, which is a customary construction. Secured to plates 5—5 depending from an axle or wheels 6—6 on a trailer of the type of my prior application are a pair of sliding clamps 10—10 adjustably attached to a cross-bar 7 and held in clamped position by bolts 11 and 12 on flanges 14—14 and 15—15, respectively, see Fig. 2.

This clamp 10 and the cross-bar 7 may be of any suitable size and contour and may be round or square, I having herein shown the same as a square hollow tube for strength and ease in assembling. To the upper bolt 11 is secured the stem 18 of a toothed circular member 20 adapted to cooperate with a correspondingly radially toothed member 21, having an upstanding stem 22 bored to receive a bolt 25, which bolt in turn is attached to clamping arms 26 and 27 of a sleeve 28 surrounding a shaft 30, carrying at each end rollers 31 and 32, which latter may be rubber, and in contact with the bottom surface 2 of one side of the boat.

In order to hold the members 20 and 21 in locked and adjusted position, as well as to quickly release them from interlocked engagement to facilitate readily adjustment of the same, I provide a bolt 35 passing thru central openings in the two members 20 and 21. Preferably the bolt 25 constitutes a pivot, being preferably heated on its opposite end sufficiently tight to afford a friction engagement so as to hold the sleeve 28 in manually adjusted upper or angular position but with sufficient freedom of rotative movement to permit the automatic self-seating of the rollers 31 and 32 when the boat is drawn in contact over the same.

The angular capacity of my bracket will be clearly appreciated and the extreme extent to which the rollers 31 and 32 may be thus automatically set by the boat itself are partially indicated in dotted lines 37 and 38.

A longitudinally adjustable set of rollers, preferably rubber, indicated at 40 and 41 are mounted on a shaft 42 held by a bracket 44 adjustably clamped about the longitudinal frame member 50 of the trailer by a clamping bolt 48, as shown in Fig. 1. Thus the keel-supporting rollers can be readily slid lengthwise but by loosening the bolt 48 and then held in position by tightening the same, it will cooperate in substantial alignment with the bottom-engaging rollers.

The triple adjustment accorded by my present invention enables the clamps 10—10 to be adjusted in either direction lengthwise of the cross-bar 7, as indicated by the arrows, Fig. 1, and thereupon the radially toothed interlocking members 20 and 21 are adjusted for height and bearing support, while the pivotally supported rollers would be automatically adjusted by the self-seating of the same thru the weight of the boat bearing thereon. The rotary action of the members 20 and 21 also provide a crosswise positioning action of the rollers to give a desired supporting bearing on the boat being transported, thereby cooperating with the slidingly adjustable supports 10—10 and the self-pivoting rollers 31 and 32, thereby affording a quick, easily accomplished, and readily effected and desired adjustment.

I claim.

A wheeled vehicle boat trailer comprising a plurality of triple adjustable boat-supporting brackets, each bracket arranged on a clamp at spaced intervals widthwise of the trailer to effect a lifting action at any angular contacting position on the bottom of a boat, each clamp being independently adjustable and having a pair of rotary toothed interlocking members including means for releasing, rotating, and then interlocking said members in angular adjustment corresponding to the bottom of a boat in contact therewith, a friction pivotal arm mounted on each one of said members, having boat-contacting elements automatically swinging said frictionally pivoted arms to correspond with the contour of the bottom of the boat resting thereon.

References Cited in the file of this patent

UNITED STATES PATENTS

| | | |
|---|---|---|
| 620,688 | Wood | Mar. 7, 1899 |
| 2,174,063 | Richards | Sept. 26, 1939 |
| 2,676,716 | Sallis | Apr. 27, 1954 |
| 2,740,639 | Eckroad | Apr. 3, 1956 |
| 2,798,625 | Mamo | July 9, 1957 |